United States Patent [19]
Gustafson

[11] 4,175,760
[45] Nov. 27, 1979

[54] SKI-SLED

[76] Inventor: Thomas A. Gustafson, 6266 Halverson Dr., Rockford, Ill. 61109

[21] Appl. No.: 849,220

[22] Filed: Nov. 7, 1977

[51] Int. Cl.² ............................................. B62B 13/14
[52] U.S. Cl. ..................................................... 280/16
[58] Field of Search ...................... 280/21 R, 16, 21 A, 280/263, 265, 267, 268, 269

[56] References Cited
U.S. PATENT DOCUMENTS

| | | | |
|---|---|---|---|
| 3,398,970 | 8/1968 | Horiuchi | 280/16 |
| 3,540,750 | 11/1970 | Berger | 280/16 |
| 3,656,775 | 4/1972 | Krautter | 280/16 |
| 3,777,831 | 12/1973 | Hale | 280/21 A X |
| 4,036,506 | 7/1977 | Scheib | 280/21 A |

Primary Examiner—Joseph F. Peters, Jr.
Assistant Examiner—Norman L. Stack, Jr.
Attorney, Agent, or Firm—Dennis H. Lambert

[57] ABSTRACT

A lightweight, molded plastic sled having ski runners, includes a pair of rear skis pivotally connected to the body of the sled and having steering handles connected therewith for steering the sled. A seat for supporting a rider on the sled is positioned generally above the rear skis, whereby the weight of the rider will assist the steering skis in obtaining a "bite" on the surface on which the sled is being used.

12 Claims, 6 Drawing Figures

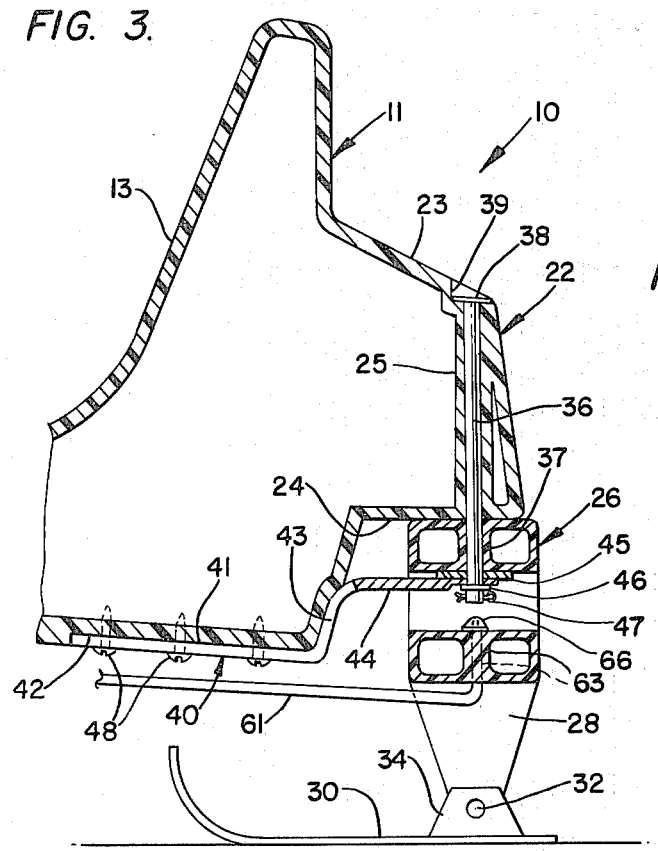
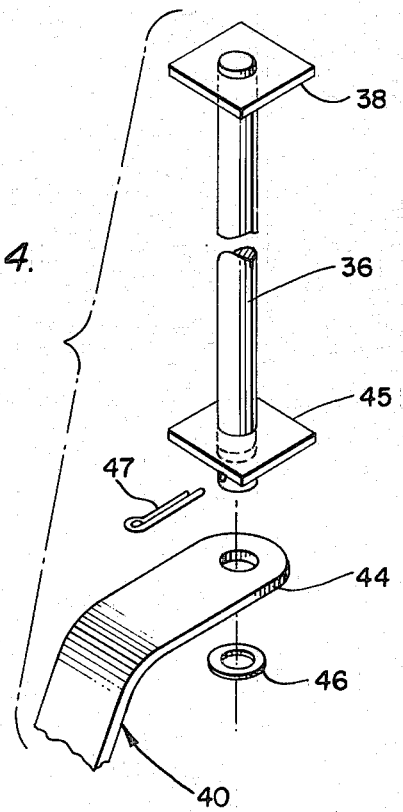
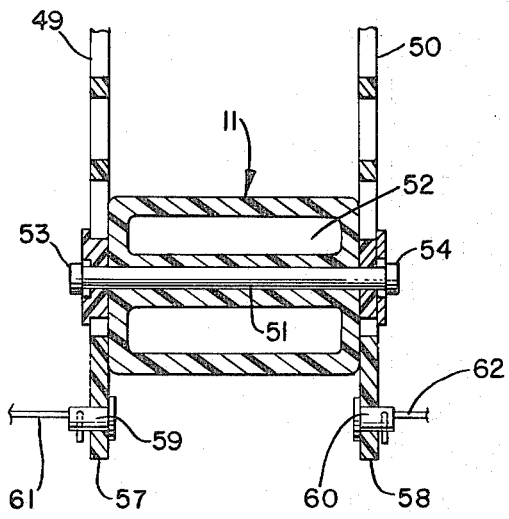
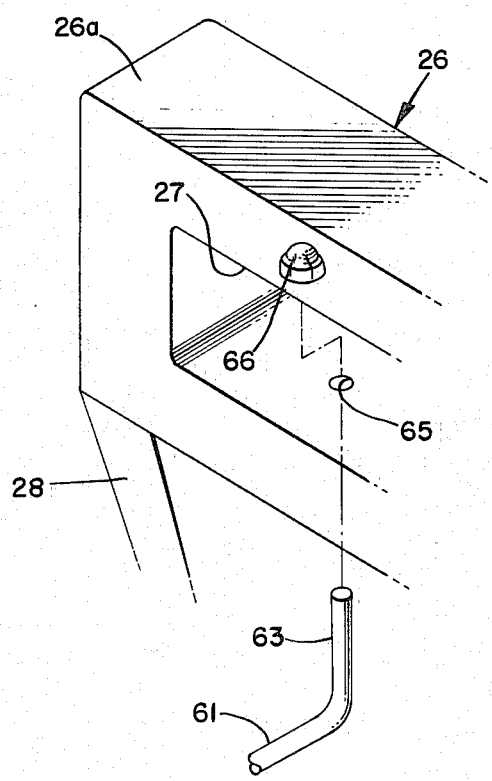
FIG. 3.
FIG. 4.
FIG. 5.
FIG. 6.

SKI-SLED

BACKGROUND OF THE INVENTION

This invention relates generally to sleds for riding on snow covered surfaces and the like, and more particularly, relates to a unique sled which combines the features of skiing and sledding. In this regard, the sled has a seating surface on which the rider sits during use but the sled itself is supported on skis or ski runners.

Many different types of sleds are known in the prior art, including those which utilize ski type runners. However, all of the sleds which are known to applicant are steered from the front (see, for example, U.S. Pat. No. 3,014,731), and a front runner or skid is manipulated in order to turn the sled. This arrangement is generally satisfactory with the most common type of sled, which utilizes a very narrow runner, since the narrow runner sinks into the snow and effective steering action is obtained even though the rider of the sled may be light in weight. Other prior art sleds, and particularly those which utilize three or four separate runners of broad contact surface such as skies or the like, are steered from the front, and when a lightweight rider is using the prior art sleds, ineffective steering action is obtained since the front steering ski or skis simply turn and slide on top of the snow or other surface. A further example of the prior art sled is disclosed in U.S. Pat. No. 368,802, wherein both front and rear sets of runners are provided, with the front set being steered and connected with the rear set to also cause steering of the rear set. Other types of devices such as wheeled vehicles may have rear steering, as for example, in U.S. Pat. No. 3,960,392, but the problems and mechanics involved with wheeled vehicles are entirely different than those encountered having ski runners.

With the present invention on the other hand, the front ski remains fixed and the rear skis are mounted for turning movement, whereby steering is accomplished from the rear skis. The rider of the sled is positioned on the sled such that most of his weight is distributed or supported on the rear skis. Thus, the rear skis or runners get a good "bite" on the snow and effective steering action is obtained even though the rider is light in weight. This is important with devices of the type with which the present invention is concerned, since most often the rider of the sled is a child and thus small in stature and light in weight. If effective steering action cannot be obtained, a dangerous situation is created which may result in the child crashing into a tree or other obstacle and being injured. Moreover, the sled of the present invention is not only easier to control, it is rugged and simple in construction and economical to manufacture.

OBJECTS OF THE INVENTION

Accordingly, an object of this invention is to provide a sled of the type which utilizes ski runners for supporting the sled on a surface during use and wherein a pair of rear runners are mounted for pivotal movement to effect the steering of the sled.

A further object of the invention is to provide a sled for children and the like wherein a plurality of separately mounted runners are used to support the sled on a surface during use and wherein a plurality of the runners are mounted for pivotal movement to effect the steering of the sled, and steering runners being positioned such that the weight of the rider is largely distributed onto said steering runners whereby effective steering action is obtained even though the rider is light in weight.

A still further object of the invention is to provide a sled for children and the like which is simple, durable and economical in construction and which is easy to steer or manipulate during use.

BRIEF DESCRIPTION OF THE DRAWINGS

FIG. 3 is an enlarged fragmentary view on section, taken alone line 3—3 in FIG. 2.

FIG. 4 is a greatly enlarged, fragmentary, perspective exploded view of part of the pivotal connecting structure between the sled body and rear runner support.

FIG. 5 is an enlarged, fragmentary view in section, taken along lin 5—5 in FIG. 2 and shows the pivotal connections between the steering arems or levers and the sled body.

FIG. 6 is a fragmentary, perspective view of the manner in which a steering link is connected to the rear runner support.

DETAILED DESCRIPTION OF THE INVENTION

Figure 2:
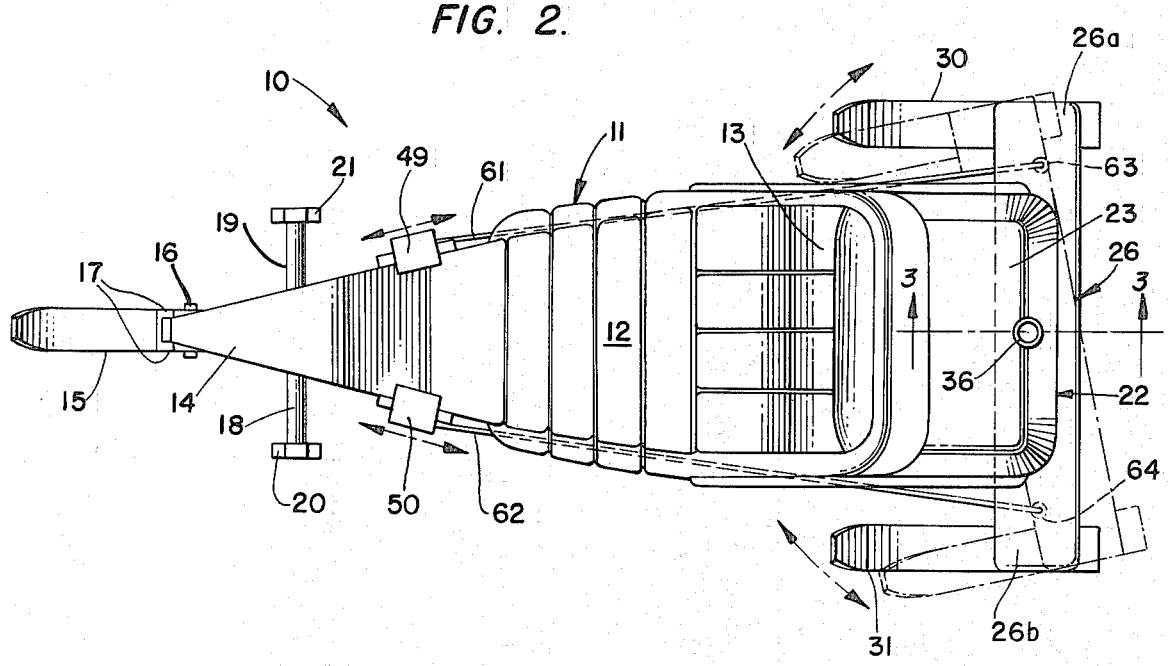
FIG. 2 is a plan view of the sled of FIG. 1.

In the drawings, wherein like reference numerals indicate like parts throughout the several views, a sled 10 in accordance with the invention comprises a one-piece, molded plastic body 11 having a generally wedge-shaped configuration in plane view, as seen in FIG. 2, and defining a generally horizontal seat or supporting surface 12, approximately midway between the front and rear of the body. An upstanding back-supporting surface 13 is formed at the rear of the seat surface 12.

The forward end of the body extends downwardly and forwardly at 14 and has a front runner or ski 15 pivotally connected thereto by means of a pivot pin 16 extended through upstanding plates or brackets 17 on the upper surface of the dki, and through an aligned opening in the lower end of forward body portion 14.

A pair of foot rests 18 and 19 are defined by a pin extended through the forward body portion 14 approximately midway the upper and lower ends thereof, and suitable stop or restraining means 20 and 21 may be provided on the outer ends of foot rests or pegs 18 and 19 for assisting the rider in keeping his feet on the pegs.

The rear end 22 of the body 11 projects rearwardly from the back rest 13 and the upper surface 23 thereof is spaced below the upper end or edge of back rest 13, and slopes downwardly and rearwardly therefrom. Similarly, the bottom surface of the body 11 is recessed at the rear portion thereof defining a support surface 24 spaced upwardly from the bottom of the middle portion or seat area of the sled body 11.

Cylindrical or tubular member 25 is molded in the rear end 22 of the body 11 and defines a pivot sleeve or tube for pivotally supporting a rear runner support or steering beam 26 to the body at the recessed area 24 in the rear portion thereof. The rear runner support or steering beam 26 extends transversely of the longitudinal axis of the body and projects outwardly at its opposite ends 26A and 26B substantially beyond the opposite sides of the body 11.

Figure 1:
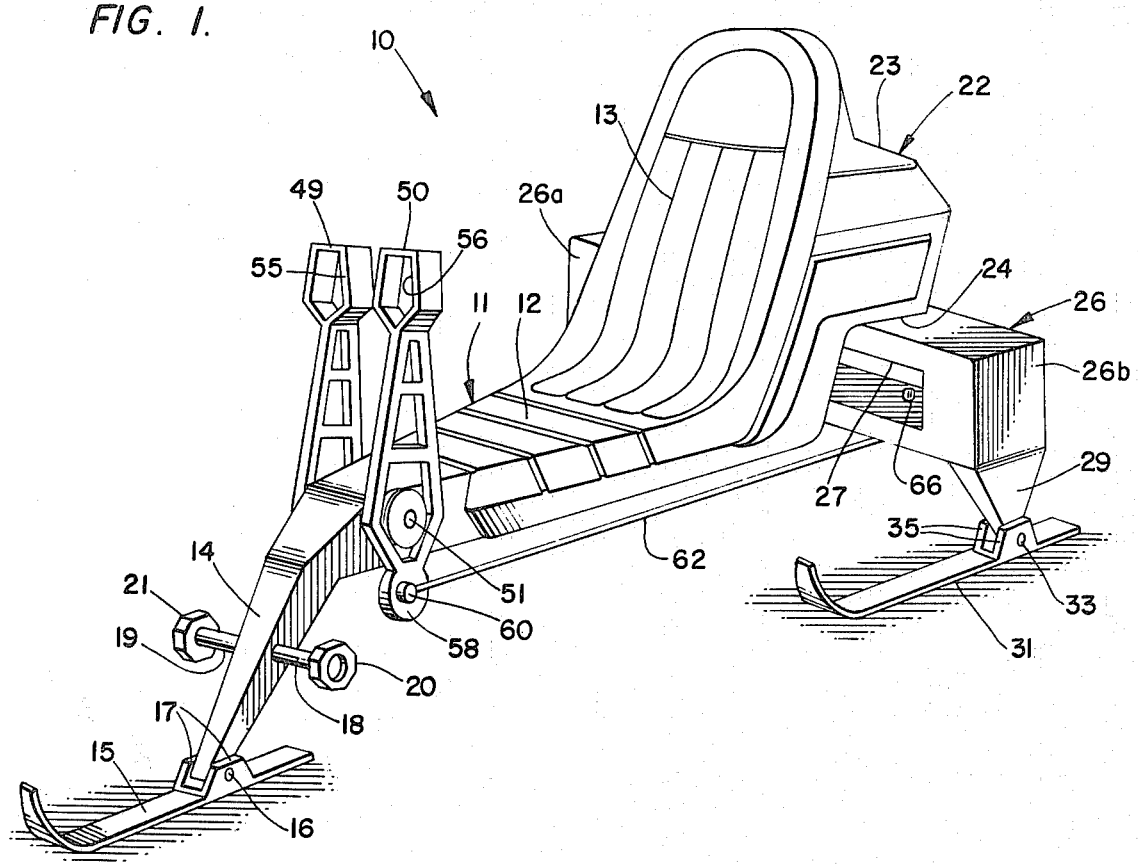
FIG. 1 is a front perspective view of the sled in accordance with the invention.

As seen best in FIG. 1 and FIG. 3, the steering beam 26 has an elongate opening 27 formed therein extending from the front to the rear thereof whereby the steering beam or rear runner support resembles a box beam in construction and has considerable strength and yet is light in weight. Further, downwardly projecting legs 28 and 29 are formed at the opposite ends 26A and 26B of the steering beam and skis or runners 30 and 31 are pivotally attached to the bottom ends of the legs 28 and 29 by means of pins 32 and 33 extended through upstanding flanges 34 and 35 on the skis and through aligned openings in the bottoms of the legs 28 and 29.

The steering beam 26 is connected to the sled body 11 by means of an elongate, steel pivot pin 36 extended downwardly through the pivot sleeve or tube 25 in the rear body portion 22 and through a similar cylindrical or tubular sleeve 37 in the top portion of steering beam 26. The pivot pin 36 has an enlarged plate 38 on its upper end which is supported in a recessed portion 39 at the rear of downwardly sloping upper surface 23 on rear body portion 22.

A reinforcing support plate 40 has one end 41 thereof nested or received in an undercut or recessed area 42 in the bottom surface of body 11 and an upwardly bent intermediate portion 43 extending upwardly approximately half the distance from the bottom most surface of body 11 to the upwardly recessed portion 24. The support plate then extends rearwardly at 44 beneath the upper portion of steering beam 26. The rear most end of rearwardly extending portion 44 of the reinforcing plate 40 has an opening therethrough through which the pivot pin 36 is received. A reinforcing plate 45 is also received over the lower end of pin 36 between the plate 44 and the bottom of the top portion of steering beam 26, and washer 46 is received over the pin on the underside of plate 44. A cotter pin or other suitable means 47 is then engaged with the lower end of pin 36 to retain the parts in assembled relationship as seen in the drawing.

Suitable fastners 48, such as screws or the like, are extended upwardly through the forward portion 41 of plate 40 into the bottom of the body 11 to retain the plate securely in position in the recessed area 42 of the body. Thus, with this arrangement the steering beam 26 is securely supported on the rear portion of body 11 for pivotal movement relative thereto, and the elongate pivot pin 36 extending from the top of rear portion 22 downwardly through the reinforcing plate 40 results in a very strong structure which at the same time is relatively simple and economical to manufacture.

In order to manipulate steering beam 26 and thus steer the sled, a pair of steering arms 49 and 50 are pivoted to the body 11 near the forward end thereof by means of a pivot pin 51 extended through the steering arms 49 and 50 between their ends and through a tubular construction or pivot tube 52 formed in the body 11. Suitable means, such as caps or the like, are press-fitted over the opposite ends of the pin 51 to assist in retaining it in position and to hide any sharpe or unsightly ends and the like.

As seen is FIG. 1, the upper ends of the arms 49 and 50 define hand grip portions 55 and 56 to facilitate gripping or grasping of the steering arms or levers 49 and 50. The lower ends 57 and 58 of the steering arms or levers have pins or fittings 59 and 60 therein with suitable openings for receiving the forward ends of steering links 61 and 62, formed of suitably strong and rigid material and extending rearwardly therefrom to adjacent the steering beam 26, and then turned upwardly at 63 and 64 and extended through aligned openings 65 and 66 in the lower part of steering beam 26. The steering links 61 and 62 are retained in position by means of caps or other suitable fasteners 66 fixed on the uppermost ends of the upturned portions 63 and 64 of steering links 61 and 62.

The sled of the present invention may be made of any suitable material. However, in a preferred construction it is made from molded polyethylene plastic, and the body has an overall length of approximately three feet, ten inches, and a height of one foot, ten inches, and the steering seam 26 has a length of about three feet. With these dimensions, the sled is designed and intended for children ages about four to ten years, but the sled obviously may be made in other sizes and dimensions for use by children of different ages.

The various pivot pins utilized are preferably made of steel, as are the steering links 61 and 62 which in one construction comprise one-quarter inch steel or iron rods.

The pivotal connections of the individual skis 51, 30 and 31 to their support legs enables the skis to pivot upwardly and downwardly at their ends to cross minor obstructions in the surface on which the sled is being used.

As this invention may be embodied in several forms without departing from the spirit or essential characteristics thereof, the present embodiment is, therefore, illustrative and not restrictive, since the scope of the invention is defined by the appended claims rather than by the description preceeding them, and all changes that fall within the metes and bounds of the claims or that form their functional as well as conjointly cooperative equivalents are, therefore, intended to be embranced by those claims.

I claim:

1. A ski sled, comprising: a body having a forward end and a rearward end, and having means defining a generally horizontal seating surface between the forward and rearward ends thereof, adjacent the rearward end; at least one forward ski carried by the forward end of the body; steering means at the rear end of the sled, including a transversely extending steering beam pivotally connected about a vertical axis to the rearward end of the body, and having opposite, outer ends projecting outwardly beyond the opposite sides of the body; a rear ski carried by the steering beam at each of the outer ends thereof, giving lateral stability to the sled; and a pair of steering arms pivoted to the body and having connecting links connected to the steering beam on opposite sides of the body to pivot the steering beam about the vertical axis and effect turning of the sled, the rear placement of the seating surface and steering means resulting in more effective steering action.

2. A sled as in claim 1, wherein an upwardly extending back rest is formed in the body at a rear portion of the seating surface.

3. A sled as in claim 1, wherein the body comprises a hollow, molded plastic unit.

4. A sled as in claim 1, wherein the forward ski comprises a single ski.

5. A sled as in claim 1, wherein the skis are each individually pivoted to the body for up and down movement thereof about substantially horizontal transverse axes.

6. A sled as in claim 5, wherein an upwardly extending back rest is formed on the body at the rear of the seating surface and the body comprises a one-piece, hollow, molded plastic unit.

7. A sled as in claim 6, wherein the forward end of the body projects downwardly and the forward ski is pivotally connected to the lower end thereof, the opposite outer ends of the steering beam having downwardly projecting legs thereon with the rear skis pivotally connected to the bottoms of the legs, and said seating surface being positioned about midway between the rear and the front of the body.

8. A sled as in claim 7, wherein the pair of steering arms are pivotally connected to the body near the forward end thereof.

9. A sled as in claim 8, wherein the steering beam is pivoted intermediate its ends to the underside of the rearward end of the body, and a pivot pin extends downwardly through the rearward end of the body and through the steering beam to pivotally support the steering beam to the body.

10. A sled as in claim 9, wherein the steering beam has an elongate opening extending therethrough from front to rear, said pivot pin engaged in the upper portion of the steering beam above the opening, and the steering links engaged with the lower portion of the steering beam below the opening.

11. A sled as in claim 10, wherein a reinforcing plate is fixedly secured to the body and extends rearwardly into the opening in the steering beam and into supporting engagement with the pivot pin at its lower end.

12. A sled as in claim 11, wherein the steering beam is shaped similarly to a transverse section of a box beam, and has great strength and yet is lightweight.

* * * * *